(12) United States Patent
Hilliard (10) Patent No.: US 6,856,250 B2
(45) Date of Patent: Feb. 15, 2005

(54) TRACKING SYSTEM, APPARATUS AND METHOD

(76) Inventor: Randy Hilliard, P.O. Box 234, New Bethlehem, PA (US) 16242

( * ) Notice: Subject to any disclaimer, the term of this patent is extended or adjusted under 35 U.S.C. 154(b) by 227 days.

(21) Appl. No.: 10/043,852

(22) Filed: Jan. 11, 2002

(65) Prior Publication Data

US 2003/0132846 A1 Jul. 17, 2003

(51) Int. Cl.[7] .............................................. G08B 23/00
(52) U.S. Cl. .................... 340/573.2; 102/502; 473/570; 473/578
(58) Field of Search ........................ 340/573.2, 539.13; 342/357.06; 463/53; 102/501, 502, 506; 473/570, 578

(56) References Cited

U.S. PATENT DOCUMENTS

| | | | |
|---|---|---|---|
| 4,238,785 A | * | 12/1980 | Hannigan .................... 342/458 |
| 4,262,632 A | | 4/1981 | Hanton et al. |
| 4,333,072 A | | 6/1982 | Beigel |
| 4,664,664 A | * | 5/1987 | Drake, Jr. .................... 102/502 |
| 4,885,800 A | | 12/1989 | Ragle |
| 4,925,129 A | * | 5/1990 | Salkeld et al. ............. 244/3.11 |
| 4,940,245 A | | 7/1990 | Bittle, Jr. |
| 4,951,952 A | | 8/1990 | Saddler |
| RE33,470 E | | 12/1990 | Boy et al. |
| 4,976,442 A | | 12/1990 | Treadway |
| 5,025,550 A | | 6/1991 | Zirbes et al. |
| 5,157,405 A | | 10/1992 | Wycoff et al. |
| 5,167,417 A | | 12/1992 | Stacey et al. |
| 5,211,129 A | | 5/1993 | Taylor et al. |
| 5,223,851 A | | 6/1993 | Hadden et al. |
| 5,239,167 A | | 8/1993 | Kipp |
| 5,281,855 A | | 1/1994 | Hadden et al. |
| 5,450,614 A | | 9/1995 | Rodriguez |
| 5,468,000 A | | 11/1995 | Bennett |
| 5,491,483 A | | 2/1996 | D'Hont |
| 5,764,156 A | | 6/1998 | Chaloux |
| 5,826,328 A | | 10/1998 | Brady et al. |
| 5,942,977 A | | 8/1999 | Palmer et al. |
| 6,043,748 A | * | 3/2000 | Touchton et al. ........ 340/573.3 |
| 6,059,677 A | | 5/2000 | Breshears |
| 6,113,539 A | * | 9/2000 | Ridenour ..................... 600/300 |
| 6,133,738 A | | 10/2000 | Minarovic |
| 6,317,030 B1 | * | 11/2001 | Magee ................ 340/573.3 X |
| 2002/0088367 A1 | * | 7/2002 | MacAleese et al. ........ 102/502 |
| 2003/0057320 A1 | * | 3/2003 | Schneider et al. ............ 244/63 |
| 2003/0060288 A1 | * | 3/2003 | Oakes ......................... 463/51 |

OTHER PUBLICATIONS

Saunders Catalogue, Tracker Tags, 2001, p. 2.

* cited by examiner

*Primary Examiner*—Thomas J Mullen, Jr.
(74) *Attorney, Agent, or Firm*—Reed Smith LLP (57) ABSTRACT

A remotely-locatable tracking device and system is presented for use with a projectile that contacts a mobile target. The device is particularly useful with hunting arrows that contact a target animal. The device detaches from the arrow and attaches to the animal upon impact. The device is preferably comprised of a passive transponder and the system preferably uses a handheld transceiver to locate the transponder attached to the target animal.

11 Claims, 9 Drawing Sheets

TRACKING SYSTEM, APPARATUS AND METHOD

BACKGROUND OF THE INVENTION

1. Field of the Invention

This invention relates generally to a system for locating a target that has been struck by a projectile, and more particularly, to a device that is carried by an arrow, is detachable from the arrow upon contacting a target, and is attachable to the target. The system can include a combination of integral and detachable transponders. A standard hunting arrow fitted with a transponder that attaches to a game animal upon impact is provided. A system and method for detecting the transponder and thereby locating the game animal is also presented.

2. Background Information

Hunting game animals with a bow and arrow has a long tradition in many parts of the world. When an arrow is shot from a bow, it can often be difficult to determine whether it hits its target or not. If the arrow misses the target, it often disappears in the brush. The loss of arrows is a matter of one expense that the hunter would ideally like to avoid. Further, if the shot is successful and the arrow hits and fatally wounds a target animal, the animal sometimes travels a significant distance before it succumbs. Depending on the terrain and the weather conditions, it can often be difficult to quickly locate an animal that has been dispatched with an arrow. Under all circumstances, it would be desirable to locate a targeted game animal that has been struck by an arrow and to do so in an expeditious and efficient manner.

While the arrow sometimes remains embedded in the game animal, in many other instances (especially with relatively small game such as white-tail deer) the arrow passes completely through the animal. Therefore, a tracking system that solely relies upon a device that is integral to the arrow and that remains with the arrow would be of little use in this instance.

Various approaches to aid in locating wayward arrows or game animals that retain the arrows after impact, are represented in the prior art. For example, U.S. Pat. No. 5,468,000 provides an arrow with an integral attachment that can be activated to emit an audible signal to facilitate location of the arrow and/or animal.

Many of the "integral arrow" devices presented in the prior art are directed to altering the structure, and consequently the aerodynamic properties, of the arrow wherein, for example, the shaft of the arrow contains a radio transmitter that allows later location of the arrow.

When a radio transmitter is incorporated as part of the structure of the arrow itself, it is not only important that the arrow contact the animal, it is also essential that the arrow remain with the animal until the animal succumbs. Often, after being struck by an arrow, an animal can break off a part of the arrow (e.g., disabling the device) or dislodge the arrow entirely, thus limiting the utility of a locator device that is incorporated into the arrow itself. In addition, if the arrow passes entirely through the animal, an integral arrow tracking device will only allow location of the arrow and not the animal. An additional disadvantage of a transmitter that is built into a shaft of an arrow is the expense of designing and building customized arrows. It would therefore be desirable if a tracking device were provided that is adaptable for use with standard arrows and therefore does not entail the expense of designing and building customized arrows.

Some other approaches are directed to the attachment of radio transmitter to a "standard arrow" of a type that a majority of archery hunters would commonly own. For example, U.S. Pat. No. 5,450,614 provides a jacket-like radio receiver that slips over the shaft of a standard arrow. Another approach has been to insert a radio transmitter between the arrowhead (e.g., broadhead) and the shaft of the arrow, such as is shown in U.S. Pat. No. 4,885,800. Alternatively, a transmitter may be secured along the length of the shaft as is shown in U.S. Pat. No 5,167,417. All of these prior art solutions suffer from the same limitations described above, namely that the arrow may pass completely through the game animal taking the transmitter with it, or an arrow that remains embedded in the animal may become broken off and disable the device, thus failing to aid in the location of the animal. These devices may also cause an undesirable change in the aerodynamic properties of the arrow.

Still another approach allows for a detachable radio transmitter to be attached to the shaft of the arrow. Upon the arrow penetrating the animal, the electronic signaling device is detached from the arrow and is embedded into the hide of the wounded game animal. However, location of the transmitter along the shaft could affect the trajectory of the arrow. Affixing a detachable tracking device at the front of a conventional arrow, for example, as part of the broadhead itself, or as a releasable insert between the broadhead and shaft, could eliminate most if not all of the above described limitations and difficulties.

Radio transmitters have been the device of choice in this field. A radio transmitter actively generates a signal that can typically be received by a hand-held location device (i.e., a receiver) carried by the hunter. However, the use of a radio transmitter presents several problems.

A radio transmitter requires a energy source, such as a battery, to generate the radio signals. Batteries add both weight and expense to the device. Also, because battery life is limited, some type of switch is typically employed to activate the radio transmitter so that the battery does not run down prior to being utilized.

One approach to conserve battery life has been to use an inertia switch to activate the radio transmitter upon shooting the arrow. One distinct disadvantage of using such a switched transmitter is the added weight of the battery and switch. To maintain accuracy over conventional distances, the hunter must somehow compensate for the heavier projectile.

Another problem with using a battery powered transmitter relates to the finite life of the battery. If the transmitter is turned on too soon (e.g. prior to contacting the animal) or if the animal is not located soon enough after contact (e.g. before the battery expires) there is no way to locate the transmitter once the battery power has drained and a signal is no longer being generated.

Thus, while the above-presented body of art describes arrows with detachable radio transmitters, these references do not teach or suggest a conventional arrow having a detachable radio transponder located at the front of the arrow wherein upon impact the transponder is attachable to the target. Such an invention would improve the state of the art significantly.

SUMMARY OF THE INVENTION

The present invention provides a tracking device that is releasably affixed to a standard arrow. The device incorporates a transponder and releases from the arrow at impact and attaches itself to the target upon contact. The transponder may be either active or passive, but is preferably passive such that it does not require its own source of power. A system and method for locating the transponder using various detection means such as a hand held transceiver, either with or without GPS technology is contemplated.

A transponder is a piece of electronic equipment that is designed to receive a specific signal and automatically transmit a specific reply. A transponder is able to take a high energy signal from an external source and utilize a portion of the energy of that signal to generate a responsive signal, albeit often a weaker signal than the signal received. In this sense, a transponder does not require a dedicated energy source. All that is required is a receiver that is capable of detecting the signal generated by the transponder in response to the energy received by the transponder from the external source. Therefore, a lightweight device that generates radio signals in response to a signal received is presented. Neither a battery nor a power switch is required in the most-preferred embodiments of the present invention which employ a transponder.

A passive transponder is basically a wire coil and capacitor surrounded in a protective envelope or covering. This unit (i.e. transponder and covering) can then be associated with a projectile. It is contemplated that upon impacting a target, the unit can detach from the projectile and attach to the target. The transponder may be self-contained, (i.e. with no external accessible connections) or it may be designed to connect with an external element, such as an antenna.

Passive transponders are activated by an external source that radiates a signal (i.e. transmits) in the area where the transponder is expected to be found. This may be done, for example, by use of a transceiver. The signal may be emitted via an inductive coil (e.g. the transmitter portion of a transceiver) that is held in the general vicinity of the transponder. When the transmitter's coil is near the passive transponder (which itself may be an inductive coil), the transponder accepts energy within its bandpass and stores it, reaching a sustained amplitude during the transmission cycle. When the transmission cycle ends, the transponder re-emits the energy at the transponder's resonant frequency with an exponentially decaying amplitude. A second coil within the transceiver unit (i.e. the receiver portion of the transceiver) acts as a receiving antenna which detects the re-radiated energy, alerting the operator, for example, with an audible tone or other indication of the transponder's presence and/or location.

Certain types of "active" transponders that could work with the present invention may include a power source such as a battery, which is incorporated into the circuitry. In this instance, the battery is used to power the signal processing circuit during operation of the transponder. An example of a battery powered radio transponder appears in U.S. Pat. No. 5,942,977, incorporated herein by reference.

Other types of transponders, such as "Half Duplex" ("HDX") transponders, may include an element for receiving energy from the transmitter, such as a coil, and an element for storing energy, for example a capacitor. In an HDX system, when the signal from the transmitter is turned off the capacitor discharges into the circuitry of the transponder to power the transponder so it can emit or generate a signal. The circuit designs for both active and HDX transponders are known in the art and therefore they are not described in detail herein. (See U.S. Pat. No. 5,942,977).

A "Full Duplex" ("FDX") transponder generally does not include either a battery or an element for storing energy. Instead, energy is induced into the antenna or coil and used to power the signal processing circuitry of the transponder and generate the response concurrently with the emission of the emitted signal from the transmitter. FDX transponder circuits are also known in the art, an early example being disclosed in U.S. Pat. No. 4,333,072.

For each of the types of transponders presently in use, there are circumstances whereby the entire transponder must be encased in a sealed member so as to allow protection from, inter alia, environment elements. For example, in the present invention, prior to impact with a target the transponder may be exposed to a wide variety of temperatures and/or precipitation. After impact with a target, the transponder may need to be protected from various biological elements associated with the game animal. Accordingly, various references, including U.S. Pat. Nos. 4,262,632; 5,025,550; 5,211,129; 5,223,851 and 5,281,855, disclose methods of completely encapsulating the circuitry of various transponders within a ceramic, glass or plastic cylinders. Further, there are numerous commercial applications that teach enclosing transponders in protective coatings (such as plastic polymers or fiberglass) and therefore they are not described in detail herein.

The present invention is directed to the manufacture, method, and use of a remotely-locatable tracking device comprising a transponder housed within a device that is releasably affixed to an arrow. The transponder may be encased in a protective material to protect it from environmental and target specific elements. In a preferred embodiment of the present invention the transponder generally attaches to a target upon impact of a projectile with the target.

The structural mechanism that releasably affixes the transponder device adjacent to an arrow shaft preferably includes either, an adjustable friction device, a break-away connector, a cone-shaped cylinder, or a fragmentation broadhead. The adjustable friction devices contemplated include, for example, a detent ball and spring, or peg-and-hole configuration. The break-away connector employed may include a washer-type insert with a snap-joint, an insert with a spring clip, an insert with stretch tubing, a breakable membrane or an adhesive bond between the transponder and the arrow. The structure that connects the transponder device to a target upon impact of the arrow with the target may include, for example, implantation by a sharpened barb, insertion of a portion of the broadhead, or a similar attaching structure. Adherence of the transponder to the target may also be accomplished through the use of an adhesive, or for example, by a chemical reaction that is catalyzed upon contact with the target (e.g. two-part epoxy).

After shooting the arrow, the transponder may generally be located by the use of a hand-held transceiver. The transceiver is preferably tuned to transmit a signal of a particular frequency and intensity such that the transponder is capable of generating a detectable signal. The transceiver is capable of detecting the return signal from the transponder such that the location of the transponder may be determined. The transponder that generates the detectable return signal may be active but is preferable passive. The transceiver may integrate GPS technology as part of the overall detection system or methodology to help determine the location of the transponder. Alternatively, a separate GPS device can be used in conjunction with the hand-held transceiver. The system and methodology of transceiver and transponder preferably operate to assist a user (e.g. a hunter) in locating the transponder within a distance of less than 300 yards, more preferably within a distance of less than 600 yards, even more preferably, within a distance of up to 1000 yards, and most preferably, at distances in excess of 1000 yards.

Before explaining various exemplary embodiments of the present invention in detail, it is to be understood that the invention is not limited in its application to the details of construction and to the arrangements of the components set forth in the following description or illustrated in the following drawings. The invention is capable of other embodiments and of being practiced and carried out in various ways that would be clear to one skilled in the projectile art as well as those skilled in the electrical art.

BRIEF DESCRIPTION OF THE DRAWINGS

The features, aspects, and advantages of the present invention will become better understood with regard to the following description, appended claims, and accompanying drawings where:

FIGS. 5B and 5D show the top views of the inserts of

FIGS. 5A and 5C, respectively, in accordance with a preferred embodiment.

DETAILED DESCRIPTION OF THE INVENTION

While specific embodiments and methods for practicing this invention are described in detail, those skilled in the art will recognize various manifestations and details that could be developed in light of the overall teachings herein. Accordingly, the particular arrangements disclosed are meant to be illustrative only.

In general, the present invention is directed to a tracking device that is releasably attached to a hunting arrow. In a preferred embodiment, the tracking device is mounted to an arrow using an insert that is adaptable to affix the device to any type or variety of hunting arrow (e.g., standard or customized). In some embodiments, the tracking device is comprised of a passive transponder incorporated into a carrying mechanism such that the device releases from the insert upon impact and attaches to the target. In certain embodiments the carrying mechanism may also serve as an antenna for the transponder to receive and or transmit signals. In other embodiments, more than one transponder may be utilized such that one detaches from the arrow upon impact and one remains with the arrow.

Figure 1:
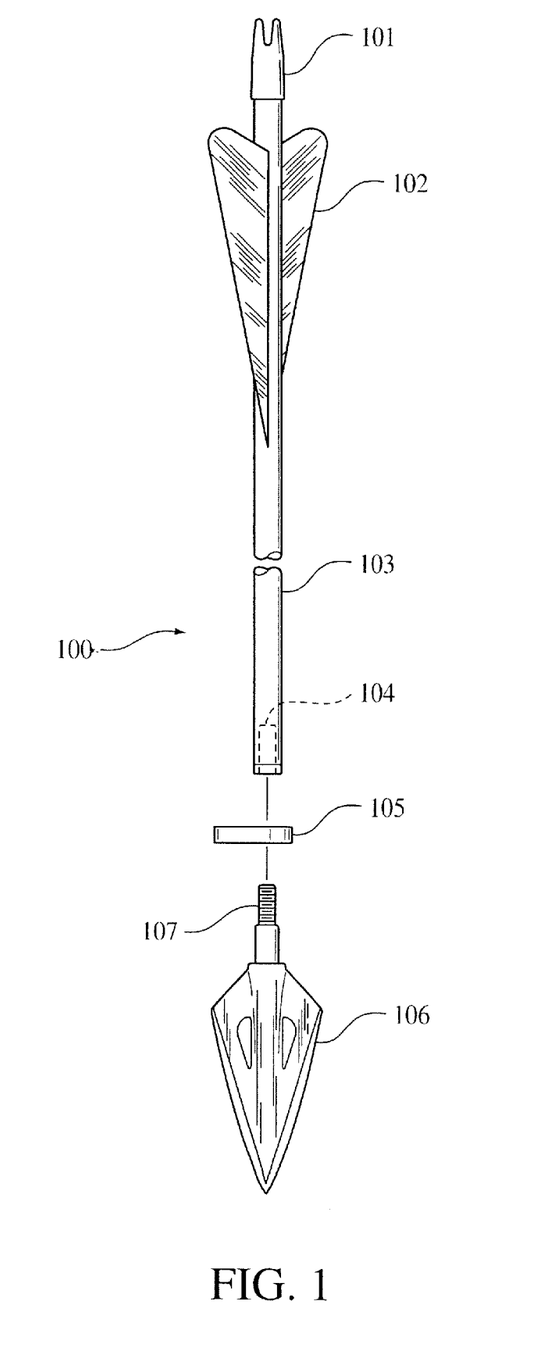
FIG. 1 is an exploded view of a standard hunting arrow depicting the general location of certain inserts that can be used to releasably affix various tracking devices adjacent to an arrow shaft.

With reference to FIG. 1, a standard hunting arrow 100 is shown with a broadhead 106, a shaft 103, fletching 102 and a nock 101. The shaft generally extends from the broadhead 106 to the nock 101. Typically, a threaded receptacle 104 is provided at one end of the shaft for accepting a threaded protrusion 107 of the broadhead 106. In one embodiment of the present invention, an insert 105 is located between the shaft 103 and the broadhead 106 and may be secured to the arrow 100 when the threaded protrusion 107 is tightened within the threaded receptacle 104. This insert may be used to releasably affix a tracking device to the arrow 100 in an unlimited variety of ways in accordance with the present invention, and as exemplified further herein.

Figure 2A:
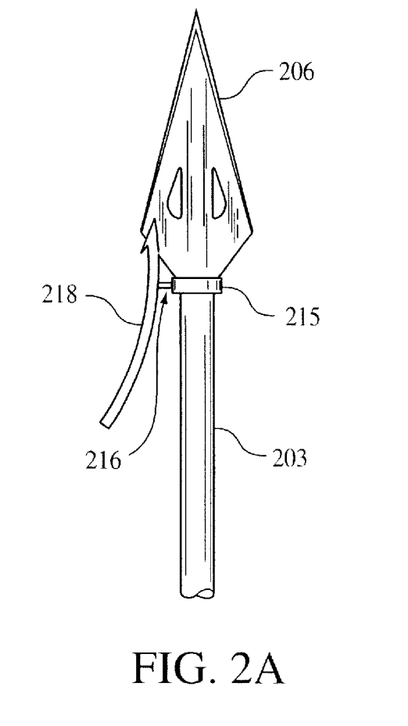
FIGS. 2A and 2B show examples of break-away connections that are perpendicular to the shaft of the arrow.
Figure 2B:
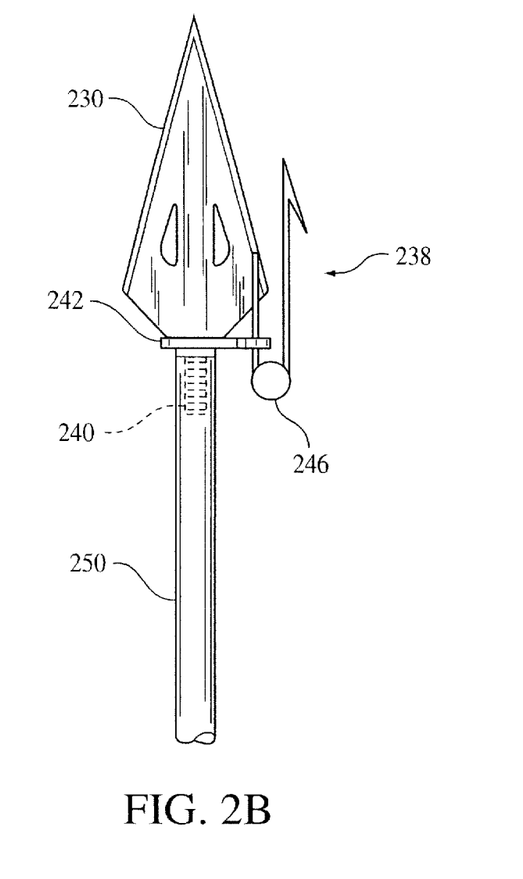

FIG. 2 shows two embodiments of the present invention that employ a break-away connection between the tracking device and the insert. Both of the break-away connections depicted in FIG. 2 are perpendicular to the shaft of the arrow. With respect to FIG. 2A, a washer-type insert 215 is located between the broadhead 206 and shaft 203. The insert 215 is structurally connected to a sickle-shaped tubular tracking device 218. The connection 216 between the insert 215 and the tracking device 218 is breakable upon application of the force that is generated upon impact of the arrow with the target. The connection 216 may be manufactured of any variety of material or type of configuration that allow the device 218 to separate from the insert 215 upon impact with a target.

The tubular tracking device 218 shown in FIG. 2A can house a transponder (not shown) of a type and specification as described herein. The tracking device 218 and washer-type insert 215 may be constructed of a variety of suitable materials, including, for example, stainless steel, spring steel, aluminum, plastic polymers, fiberglass or some combination of components made of metal alloy and plastic.

With respect to FIG. 2B, a washer-type insert 242 is located between the broadhead 230 and the arrow shaft 250. The tracking device 238 is fixedly secured to the insert 242 at a part distal to the arrow shaft 250. The hairpin-shaped tracking device 238 houses a transponder assembly 246 of a type and specification as described further herein. It is preferable that the transponder assembly weigh less than 200 grams, more preferably less than 100 grams, even more preferably, less than 50 grams and most preferably less than 25 grams.

Figure 2C:
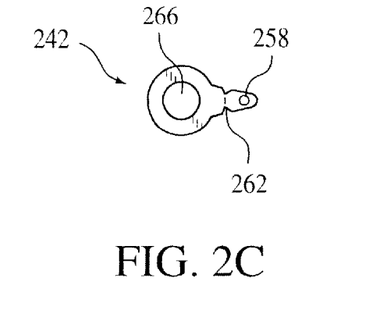
FIG. 2C shows the top view of the insert in FIG. 2B in accordance with a preferred embodiment.

In the embodiment shown in FIG. 2B it is possible to rotatably adjust the tracking device 238 within its attachment to the insert 242. FIG. 2C displays a top view of the washer-type insert 242. The insert 242 possesses a first hole 266 through which the threaded protrusion 240 of the broadhead 230 is inserted into the arrow shaft 250. The insert 242 also possesses a second smaller hole 258 distal to the first hole for securing the tracking device 238. This distal hole 258 can serve as a pivot point for rotatably adjusting the tracking device 238. The insert 242 has a joint 262 located between the first hole 266 and the second hole 258 such that the portion of the insert 242 containing the tracking device 238 can "break-away" from the main arrow at this notched-joint 262, upon impact with the target due to the force that is generated by contact with the target. The joint 262 may consist of a weakened, narrowed, notched or perforated portion of the insert 242.

Figure 3A:
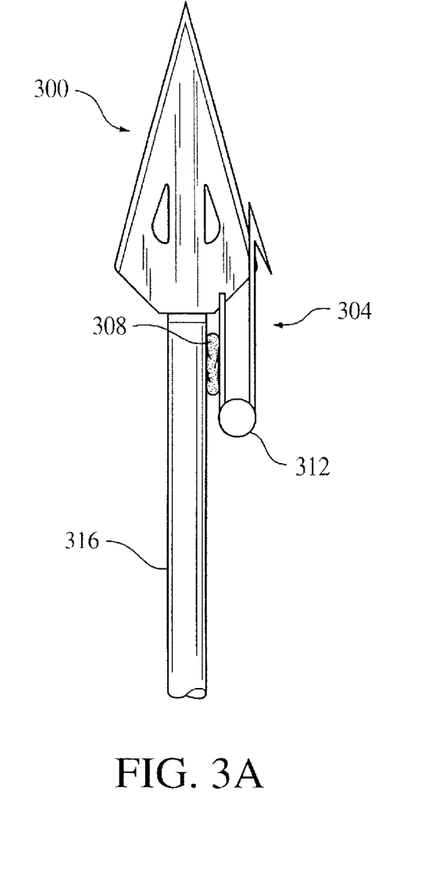
FIGS. 3A and 3B show examples of break-away connections that are parallel to the shaft of the arrow.
Figure 3B:
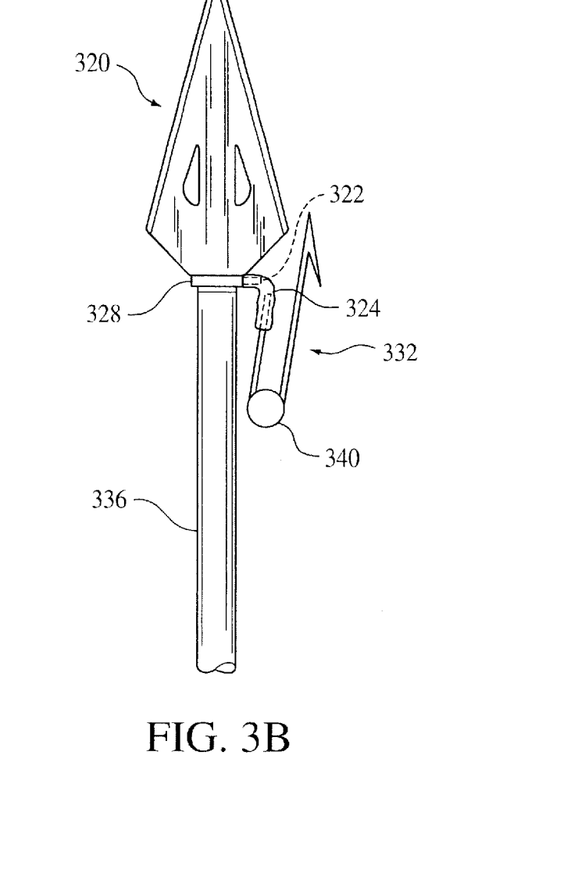

FIG. 3 displays two embodiments of the present invention that also employ break-away connections between the tracking device and the arrow. In these examples, the break-away connections are parallel to the shaft of the arrow. With reference to FIG. 3A, a broadhead 300 is shown attached to an arrow shaft 316. The tracking device 304 is attached to the arrow shaft 316 by the use of adhesive 308. No insert between the arrow shaft and the broadhead is required in this embodiment. As previously described, the hairpin-shaped tracking device 304 houses a transponder assembly 312. For example, the transponder 312 may be encased in a protective material that is integrally formed to the other structure(s) of the tracking device 304. The force generated when the arrow strikes the target causes the tracking device 304 to break away from the arrow shaft 316 at the point of the adhesive 308.

In FIG. 3B, the tracking device 332 is attached to an insert 328 by the use of stretchable tubing 324. An insert 328 is located between the broadhead 320 and the arrow shaft 336. The insert 328 possesses a small protrusion 322 on one aspect for connecting a piece of stretchable tubing 324. The other end of the stretchable tubing 324 can then be attached to the tracking device 332. The tracking device 332 preferably contains a transponder assembly 340 as described further herein. In this embodiment, when the arrow strikes the target, the force generated upon impact causes implantation of the tracking device 332 into the target with the continued penetration of the arrow stretching the tubing 324 to a breaking point, thus causing the device 332 to detach from the insert 328 and remain with the target.

Figure 4A:
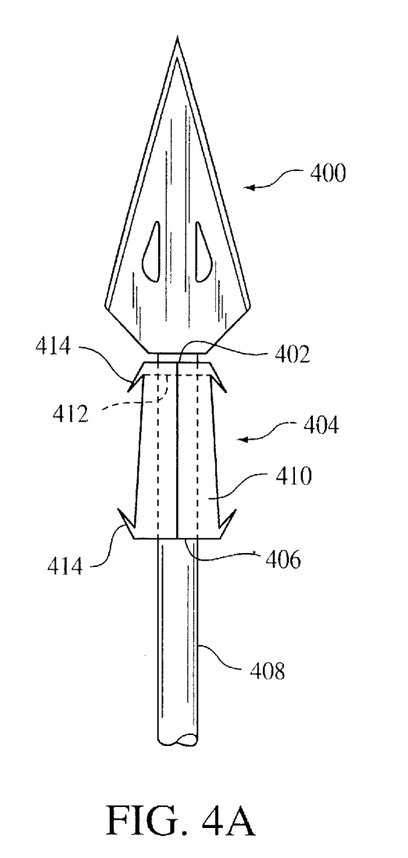
FIGS. 4A and 4B depict examples of adjustable friction connections.
Figure 4B:
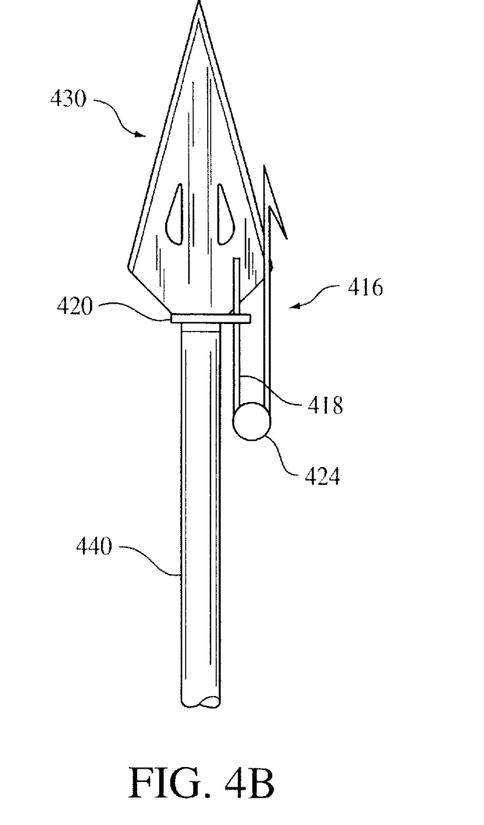

FIG. 4 displays two embodiments of the present invention that employ adjustable friction devices for releasably attaching the tracking device to the arrow. In FIG. 4A, a conical tracking device 404 is releasably attached to the arrow shaft 408 behind the broadhead 400. At both ends of the tracking device 404 is a generally circular opening. The first opening 402 towards the broadhead 400 is typically smaller than the second opening 406 furthest from the broadhead 400. The transponder (not shown) may be incorporated within the wall 410 of the conical tracking device 404 or, alternatively, the transponder (not shown) may be adhered to a wall 410 of the conical tracking device 404. A stretchable membrane 412 may be used to secure the tracking device 404 to the arrow shaft 408. The membrane 412 could be composed of any appropriate elastic material, including, for example, plastic or latex film. The threaded portion of the broadhead 400 may be inserted through an opening in the membrane (for example, as shown in FIG. 2C element 266) and attached to the arrow shaft 408 in standard fashion. When the arrow strikes and enters a target, the barbs 414 on the tracking device 404 engage the target. As the arrow proceeds into the target the length of the arrow shaft 408 passes through the tracking device 404. The large opening 406 (i.e. furthermost from the broadhead) of the conical tracking device 404 serves to "funnel" the device 404 over the fletching of the arrow upon impact with the target thereby rupturing the membrane 412, and allowing the tracking device 404 to slide completely off of the arrow shaft 408 and remain with the target.

Figure 4C:
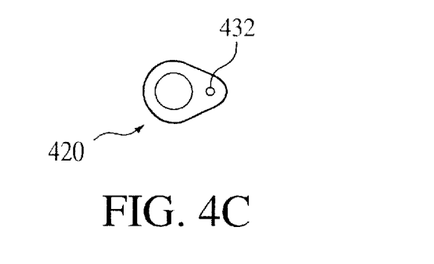
FIG. 4C shows the tope view of the insert in FIG. 4B in accordance with a preferred embodiment.

In the embodiment displayed in FIG. 4B, a washer-type insert 420 is located adjacent to the broadhead 430 and the arrow shaft 440. The tracking device 416 is releasably affixed within an opening (shown as 432 in FIG. 4C) in the insert 420. The opening 432 is of slightly smaller diameter than the arm 418 of the tracking device 416. Thus, the tracking device 416 is secured to the insert 420 by the friction created by virtue of the varying diameters of the arm 418 and the opening 432. The hairpin-shaped device 416 preferably houses a passive transponder 424 that can be used to locate a target as described further herein. Preferably, when the arrow strikes the target the tracking device 416 disengages from the insert 420 by overcoming the friction of the arm 418 within the opening 432 and attaches to the target.

Figure 5A:
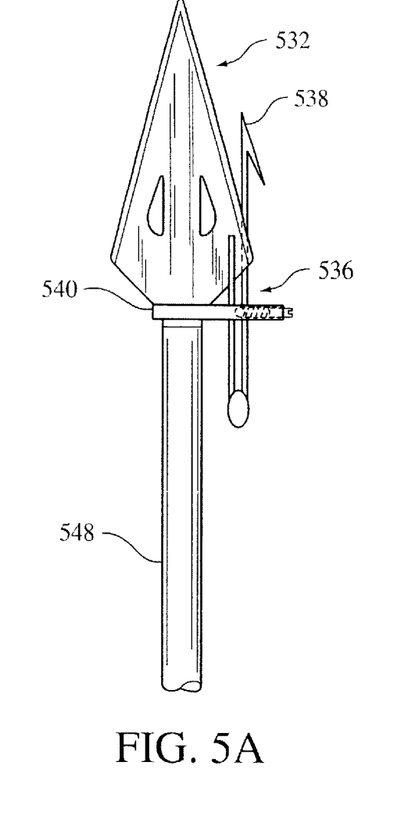
FIGS. 5A and 5C depict examples of adjustable friction connections.

In FIG. 5A an insert 540 is shown located adjacent to the broadhead 532 and the arrow shaft 548. The tracking device 536 is similar to those previously described in FIGS. 2B, 3A, 3B and 4B. In this adjustable friction insert 540, the tracking device 536 is releasably affixed to the insert 540 by the mechanism which is best viewed in the overhead view of the insert 540 shown in FIG. 5B.

Figure 5B:
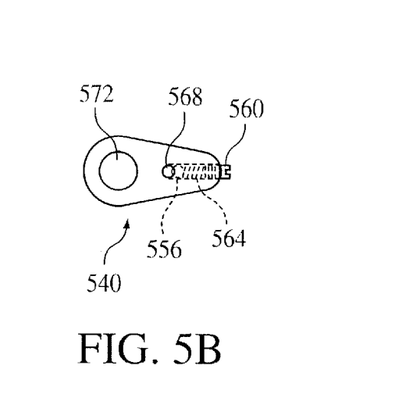

With respect to FIG. 5B, the insert 540 possesses a first opening 572 through which the broadhead 532 may be screwed into the arrow shaft 54 insert also has a second opening 568 into which the tracking device 536 is engaged. The insert 540 has a screw 560 engaged within a threaded channel perpendicular to the opening 568. The screw 560 is adjacent to a spring 564 that is itself adjacent to a ball bearing 556. The ball bearing partially occludes the second opening 568. The screw 560 may be rotated to adjust the size of the opening 568, thereby adjusting the tension with which the insert 540 engages the tracking device 536. Preferably, the tension is set so that, as the arrow strikes the target, and the point 538 of the device penetrates the target, the tracking device 536 disengages from the insert 540 and remains in the target.

Figure 5C:
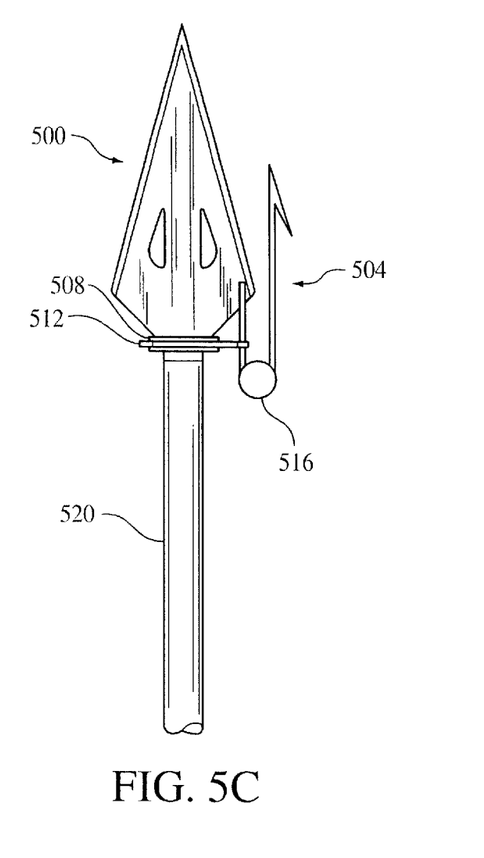

FIG. 5C displays an embodiment of the present invention that employs an alternate friction-dependent releasable attachment between the tracking device and the arrow. The tracking device 504 is secured to the arrow by a spring clip 512. An annular insert 508 is located adjacent to the broadhead 500 and the arrow shaft 520. A spring clip 512 is releasably affixed around the circumference of the annular insert 508. The tracking device 504 is secured to the spring clip 512, for example, by engaging an opening 528 within the spring clip 512. The hairpin-shaped tracking device 504 houses a transponder 516.

Figure 5D:
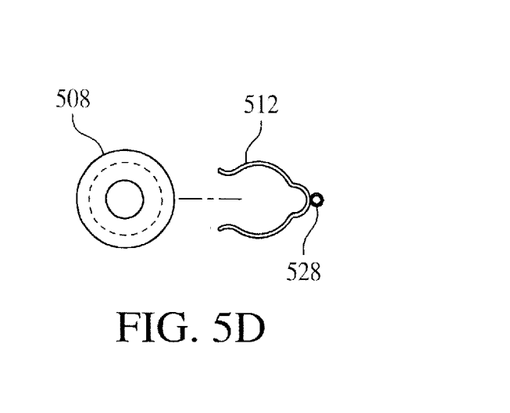

The inset FIG. 5D displays a top view of the annular insert 508 and spring clip 512. The spring clip 512 fits over the circumference of the annular insert 508 and thereby remains secure during flight of the arrow due to the tension created between the variation in diameter between the outside of the annular insert 508 and the inside diameter of the spring clip 512. Preferably, upon impact of the arrow with the target, the force generated by the arrow upon penetrating the target causes the tracking device 504 to be released with the spring clip 512 from the annular insert 508 to thereby attach to and remain with the target.

Figure 6:
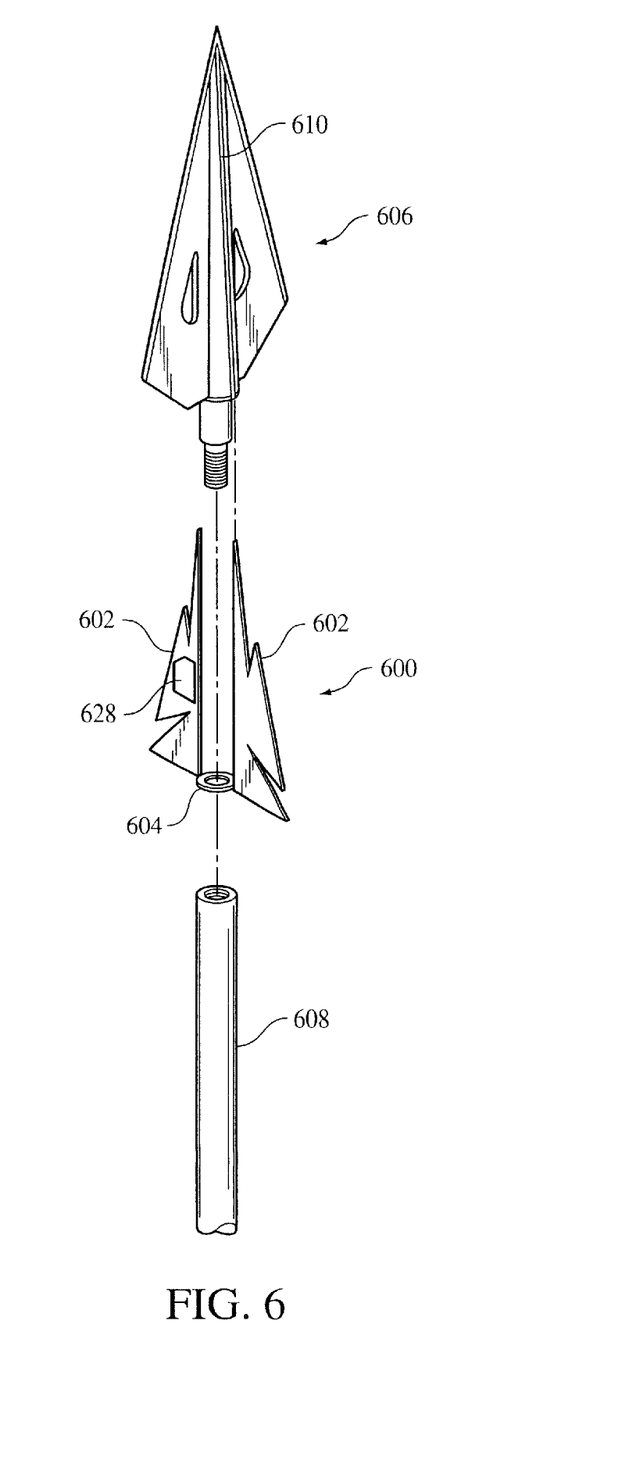
FIG. 6 shows an exploded view of a fragmentation broadhead with break-away components.

FIG. 6 displays an embodiment of the present invention that employs a fragmenting broadhead 606 as the carrier for the tracking device 600. In FIG. 6, the tracking device 600 is shown above the arrow shaft 608 and below a two-blade broadhead 606. As shown, the broadhead 606 has a pair of parallel grooves 610 located on opposite sides of the broadhead's surface that engage the tracking device 600. The tracking device 600 is composed of two blades 602 of similar size and shape to the broadhead that will slide into the grooves 610 of broadhead 606. The circular ring 604 that is located between the blades 602 of the tracking device 600, further secures the device 600 between the arrow shaft 608 and the broadhead 606. A transponder 628 may either be attached to one (or both) of the blades 602 of the tracking device, or the blades 602 could integrally house (e.g. be formed around) the transponder assembly upon initial construction. As the arrow enters the target, the two components 602 of the tracking device 600 may fragment away from and separate from the ring 604 and the broadhead 606. The connection between the two components 602 and the ring 604 is such that the impact of the arrow striking the target is sufficient to disrupt the connections between the components 602 and the ring 604 and the grooves 610, and allow the tracking device 600 to remain with the target. The blades 602 may be composed of any suitable material including, for example, light weight metals, high impact plastic carbon fiber overlay or fiberglass. As mentioned previously, the blades 602 may also serve as the housing for a transponder unit.

Figure 7:
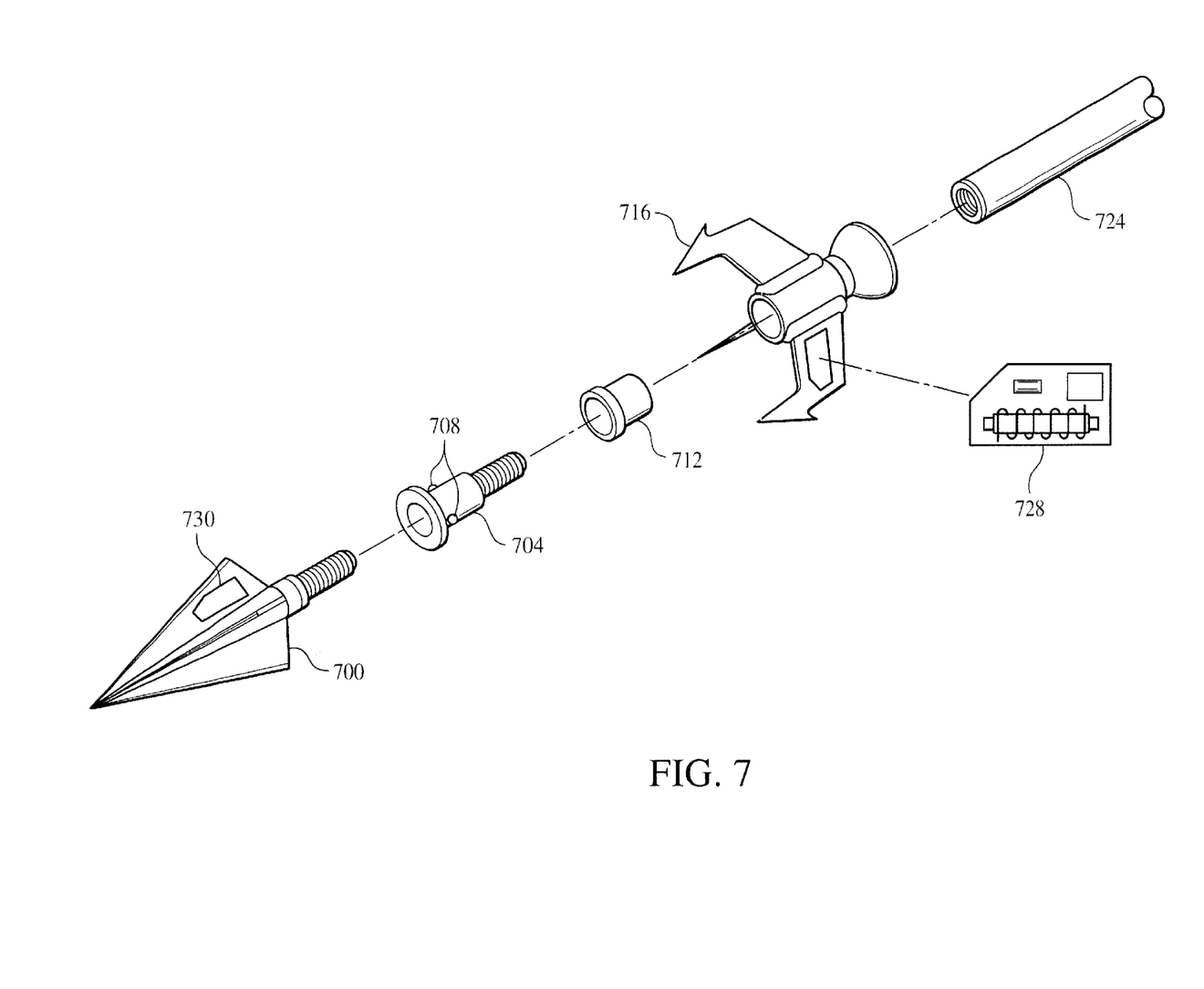
FIG. 7 shows an exploded view of a detachable barb assembly with a treaded coupler oriented between a broadhead and arrow shaft.

A break-away barb assembly is shown in FIG. 7 wherein the transponder 728 can be either molded into the barb 716 or adhered to its surface. Preferably, the barb 716 is preferably constructed of a durable material such as metal, high impact plastic or fiberglass, and of sufficient strength to withstand impact with a target. Preferably the energy of impact will be sufficient to release the barb 716 (containing transponder 728) from the coupler 704, over the arrow shaft 724 to imbed the barb 716 into the target.

One embodiment of this concept as shown in FIG. 7 incorporates three components that are carried between a standard broadhead 700 and arrow shaft 724. The first component is a threaded coupler 704 that is machined to receive a threaded broadhead 700 at one end and threaded to connect with a standard arrow shaft 724 at the other end. The threaded coupler 704 may include a detachable release to engage a second component, such as a bushing 712 that is connected to the threaded coupler 704 preferably by ball detents 708. The bushing serves to frictionally retain the third component, the barb 716, in releasable engagement with the coupler 704.

A second embodiment represented is an arrangement using more than one transponder. For example, with reference to FIG. 7, a first transponder 728 may be incorporated into a break-away tracking device 716 and a second transponder 730 may be incorporated, into the broadhead 700 such that it remains with the arrow. Any number and combination of fixed and detachable transponders are contemplated with the various embodiments of the present invention previously described herein. Also, any of the previously described fixed tracking devices that are integral to an arrow shaft may be used in combination with the releasable devices of the present invention.

Figure 8:
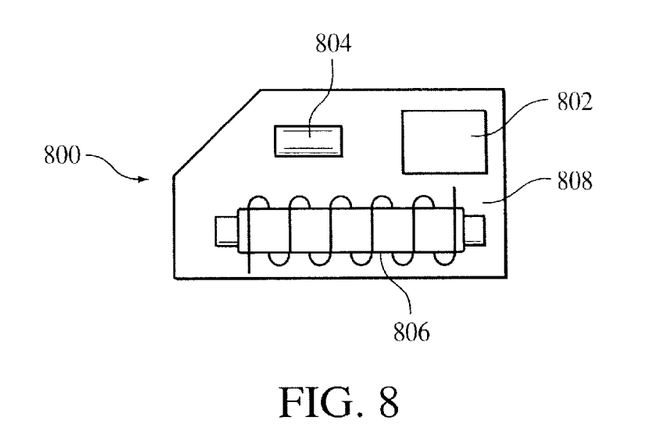
FIG. 8 is an enlarged view of the transponder package/assembly including the transponder chip, components, and the housing/covering.

A graphical depiction of a transponder unit 800 (i.e., transponder assembly) that may be used with the present invention is shown in FIG. 8. The transponder unit 800 consists of a transponder chip 802, at least one capacitor 804, and a coil 806, all of which are integrated within a housing 808 to form a unit. As discussed previously, this unit 800 is assembled within its housing 808 to withstand various elements and external forces that are anticipated by the practice of this invention.

Figure 9:
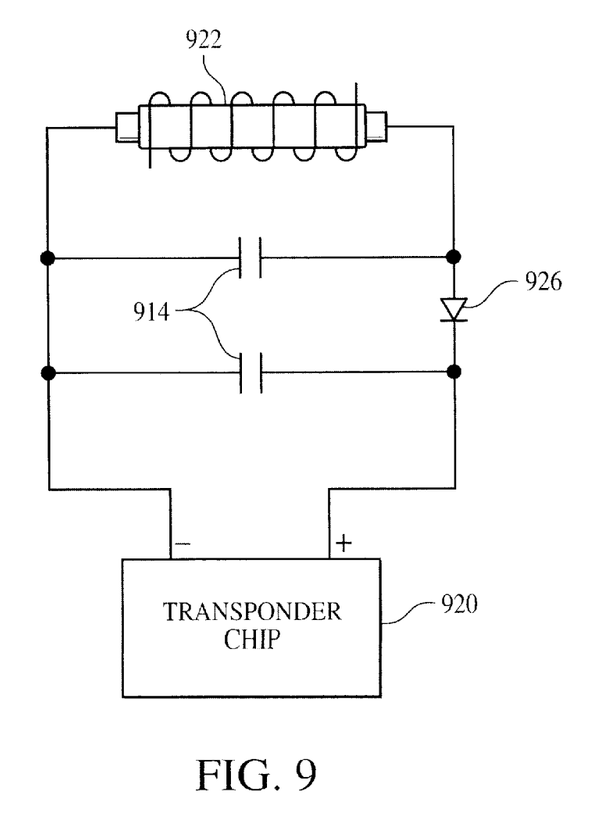
FIG. 9 is a schematic of a transponder circuit depicting an arrangement of components in accordance with a preferred embodiment.

An example of a circuit layout of the transponder unit (absent the housing) is shown in FIG. 9. The transponder unit preferably includes a coil 922 to receive a signal, and a 1-bit transponder chip 920 that operates in the microwave frequency range of about 2.45 GHz to process the received signal and emit a return signal. Regardless of the frequency chosen, the transponder can preferably be "tuned" or matched for receiving a signal from a transmitter. Further, the transponder may be uniquely identifiable, for example, as shown in U.S. Pat. Nos. 5,491,483, and 5,764,156, both incorporated herein by reference for this teaching. The transponder unit may include two capacitors 914 that are wired in parallel with each other and in series with a diode 926. A circuit diagram displaying an example of the connections between electronic components that may be used to make a passive transponder unit in accordance with the present invention is shown in FIG. 9.

Figure 10:
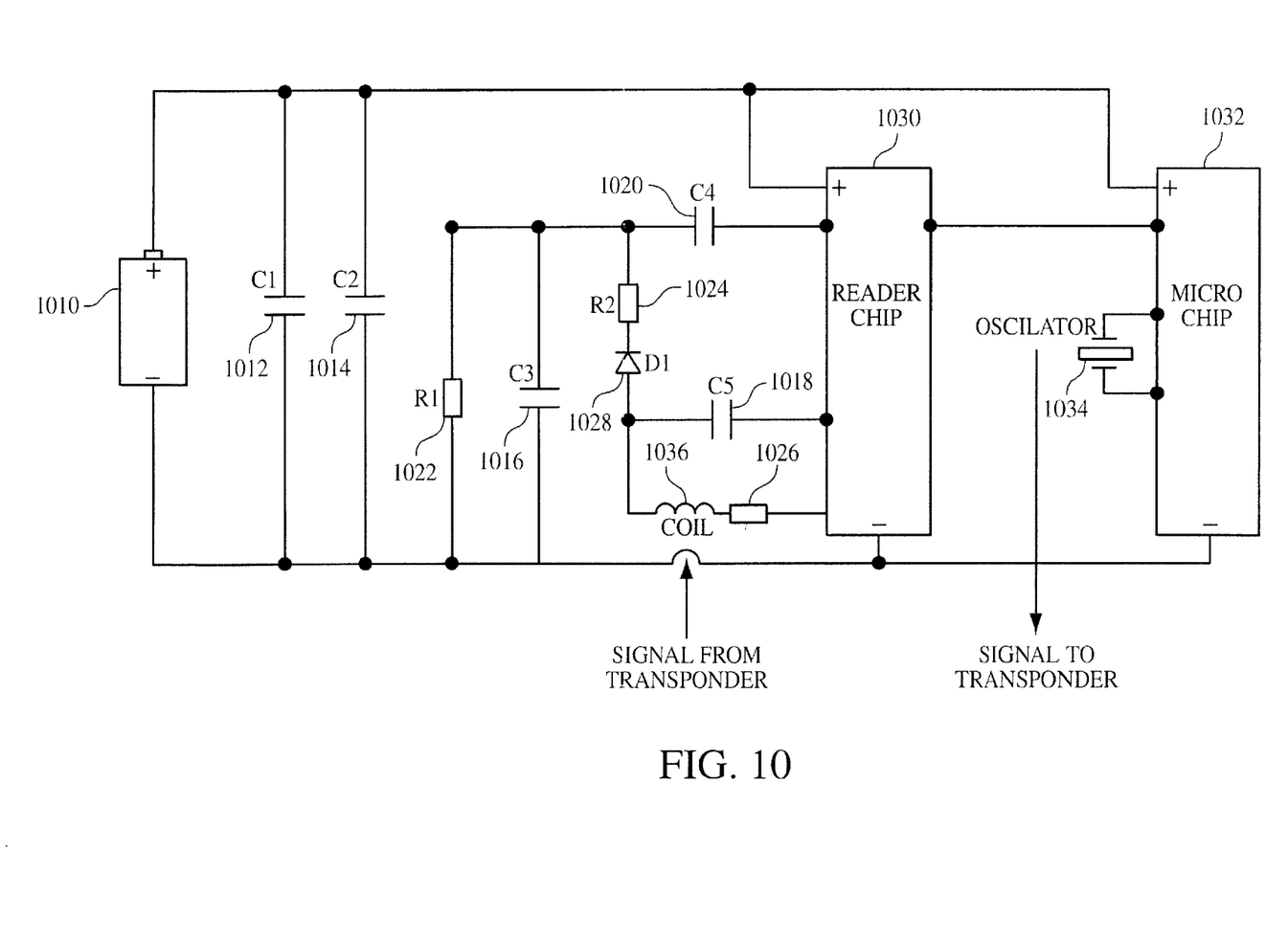
FIG. 10 is a schematic of a reader/detector/transceiver depicting an arrangement of components in accordance with a preferred embodiment.

The signal may be generated, transmitted, received and detected by a device that is constructed in accordance with the exemplary circuit diagram shown in FIG. 10. The device of FIG. 10 is a transceiver in that it both transmits a signal to and receives signals from a transponder. Alternatively, the system and method of the present invention could be practiced with a separate transmitter unit and a separate receiver unit, but it is preferable to integrate these functions into a single device.

The transceiver of FIG. 10 contains a battery pack 1010, a first capacitor 1012 having a value for example of 47 nano farads (nF) +/−20 nF, a second capacitor 1014 having a value for example of 22 nF +/−10 nF, a third capacitor 1016 and a fourth capacitor 1018 each having a value for example of 1.5 nF +/−0.25 nF, and a fifth capacitor 1020 having a value for example of 700 pF.

Also shown in FIG. 10 are three resisters (1022, 1024, 1026) a diode 1028, and a coil 1036 (having a value, for example, of 1.35 mH) for receiving a return signal from a transponder. Reader chip 1030 in conjunction with microchip 1032 read the incoming signal, interpret the signal and, with oscillator 1034, generate and send out a signal (e.g. 2.45 GHz) to the transponder.

Preferably the transponder is tuned to receive the signal sent from the transceiver. The transceiver may also function to provide the operator with an indicator of direction, preferable by means of a visual cue such as a light array. Similarly, the transceiver unit will preferably function to output an indicator of distance, for example, by showing the relative strength of the return signal being received from the transponder.

In addition to bilateral signal generation, transmission, receipt, retransmission and detection as described, the use of triangulation methods are also contemplated. For example, Global Positioning System (GPS) technology could easily be incorporated into the methods of the present invention. One example of augmenting the present invention with GPS technology would be for the operator to carry a separate GPS unit to record his position prior to beginning signal transmission to locate a tracking device previously imbedded in a target. Upon sending and receiving an initial signal, the operator could use the GPS reading to establish a "search zone" where the target is most likely to be found. This zone could be established from a combination of signal direction (as indicated by the transceiver unit) and distance (as indicated by a known range of detection or an indicator of signal strength, for example). Upon conducting the search, the operator could record his movement using the output from the GPS unit to thereby conduct a systematic search for the target.

While specific embodiments and methods for practicing this invention have been described in detail, those skilled in the art will recognize various manifestations and details that could be developed in light of the overall teachings herein.

Accordingly, the particular arrangements disclosed are meant to be illustrative only and the following claims are to be given their full breadth.

What is claimed is:

1. A remotely-locatable tracking device comprised of:

a transponder assembly:

said assembly being releasably affixed adjacent to a shaft of an arrow by a structure, said structure being an adjustable friction device selected from the group consisting of a detent ball spring or a peg-and-hole configuration; and means for attaching said assembly to a target upon impacting the target with the arrow.

2. The tracking device of claim 1, wherein said means for attaching the releasably affixed structure to said target includes a fragmentation broadhead having at least one break-away component.

3. The tracking device of claim 1, wherein said transponder is passive.

4. The tracking device of claim 1 further comprising a second transponder integral to the arrow shaft.

5. The tracking device of claim 4, wherein said second transponder emits a uniquely identifiable signal relative to the transponder contained within the releasably affixed— transponder assembly.

6. The tracking device of claim 1, wherein said device is detectable by a transceiver within a range of about 50 yards to about 500 yards.

7. The tracking device of claim 1 wherein said device is locatable at a range in excess of 500 yards.

8. A remotely-locatable tracking device comprised of:

a transponder assembly;

said assembly being releasably affixed adjacent to a shaft of an arrow by a structure, said structure being a break-away connector selected from the group consisting of a washer insert with a snap-joint, a washer insert with a spring clip, a washer insert with a stretch tube or an adhesive bond, and;

means for attaching said assembly to a target upon impacting the target with the arrow.

9. The tracking device of claim 8, wherein said means for attaching the releasably affixed structure to said target includes a fragmentation broadhead having at least one break-away component.

10. The tracking device of claim 8 further comprising a second transponder integral to the arrow shaft.

11. The tracking device of claim 10, wherein said second transponder emits a uniquely identifiable signal relative to the transponder contained within the releasably affixed— transponder assembly.

* * * * *